United States Patent
Renstrom

(10) Patent No.: US 7,992,341 B1
(45) Date of Patent: Aug. 9, 2011

(54) VISUAL MARK HIGH VISIBILITY ICE FISHING TIP-UP

(76) Inventor: Ryan Renstrom, Maple Lake, MN (US)

(*) Notice: Subject to any disclaimer, the term of this patent is extended or adjusted under 35 U.S.C. 154(b) by 411 days.

(21) Appl. No.: 12/018,101

(22) Filed: Jan. 22, 2008

Related U.S. Application Data

(60) Provisional application No. 60/885,891, filed on Jan. 20, 2007.

(51) Int. Cl.
*A01K 97/12* (2006.01)
*A01K 97/01* (2006.01)

(52) U.S. Cl. .......................................................... 43/17

(58) Field of Classification Search ............... 43/17, 16, 43/15, 43.12
See application file for complete search history.

(56) References Cited

U.S. PATENT DOCUMENTS

| | | | | |
|---|---|---|---|---|
| 1,443,981 A | * | 2/1923 | Eccleston | 43/17 |
| 1,451,124 A | * | 4/1923 | Stolze | 43/17 |
| 1,737,921 A | * | 12/1929 | Derr | 43/17 |
| 2,032,537 A | * | 3/1936 | Kozikowski | 43/16 |
| 2,089,097 A | * | 8/1937 | Millett | 43/16 |
| 2,122,841 A | * | 7/1938 | Laurila | 43/17 |
| 2,170,000 A | * | 8/1939 | Eggleston | 43/17 |
| 2,237,536 A | * | 4/1941 | Wells, Jr. | 43/17 |
| 2,399,435 A | * | 4/1946 | Gregory | 248/538 |
| 2,448,346 A | * | 8/1948 | Baugh et al. | 43/17 |
| 2,506,092 A | * | 5/1950 | Lyons | 43/17 |
| 2,556,628 A | * | 6/1951 | Nisle, Sr. | 43/17 |
| 2,565,379 A | * | 8/1951 | Laurila | 43/17 |
| 2,567,777 A | * | 9/1951 | Massino | 43/17 |
| 2,575,156 A | * | 11/1951 | Baugh et al. | 43/17 |
| 2,616,202 A | * | 11/1952 | Romberger | 43/17 |
| 2,619,559 A | * | 11/1952 | Schenkel | 43/17 |
| 2,624,972 A | * | 1/1953 | Burg | 43/17 |
| 2,636,303 A | * | 4/1953 | Feigley et al. | 43/17 |
| 2,649,801 A | * | 8/1953 | Freeman | 43/17 |
| 2,650,052 A | * | 8/1953 | Bintz | 43/21.2 |
| 2,654,176 A | * | 10/1953 | Kachelski et al. | 43/17 |
| 2,657,494 A | * | 11/1953 | Brundage | 43/17 |
| 2,663,962 A | * | 12/1953 | King | 43/17 |
| 2,679,036 A | * | 5/1954 | Ferguson | 43/17 |
| 2,720,719 A | * | 10/1955 | Stancheck et al. | 43/17 |
| 2,732,649 A | * | 1/1956 | Tuttle | 43/17 |
| 2,741,054 A | * | 4/1956 | Brundage | 43/17 |
| 2,773,326 A | * | 12/1956 | Calvert | 43/16 |
| 2,785,493 A | * | 3/1957 | Thiel | 43/17 |
| 2,795,072 A | * | 6/1957 | Porter | 43/16 |
| 2,803,912 A | * | 8/1957 | Kellar | 43/16 |
| 2,811,802 A | * | 11/1957 | Schmidt | 43/17 |
| 2,837,857 A | * | 6/1958 | Ellison | 43/17 |
| 2,908,100 A | * | 10/1959 | Mogren | 43/17 |

(Continued)

*Primary Examiner* — Darren W Ark
(74) *Attorney, Agent, or Firm* — Albert W. Watkins

(57) ABSTRACT

An ice fishing tip-up incorporates a visual marker rod which operates separately from the tip-up strike indicator. The visual marker rod is pivotal between a storage position parallel to and within the plane of the base and a position generally perpendicular thereto. To separately operate the tip-up strike indicator, a flag stay holds the strike indicator flag prior to a fish strike. The flag stay deviates from the longitudinal axis of a pivoting inner rod, in turn coupled to the spool, by more than ninety degrees, such that the inner rod and flag stay may be positioned to capture and hold a tip-up indicator flag in an orientation generally parallel to the tip-up base. The flag stay, in addition to angle, also incorporates an apparatus to hold the tip-up indicator flag at more than one position along the flag stay, thereby permitting reliable and repetitive setting of different activation forces.

10 Claims, 2 Drawing Sheets

U.S. PATENT DOCUMENTS

| | | | | |
|---|---|---|---|---|
| 2,931,122 A * | 4/1960 | Thordson et al. | | 43/17 |
| 2,970,400 A * | 2/1961 | Nolin | | 43/17 |
| 2,973,599 A * | 3/1961 | Olson | | 43/17 |
| 2,977,704 A * | 4/1961 | Tinsley | | 43/17 |
| 3,037,314 A * | 6/1962 | Hardy | | 43/17 |
| 3,041,770 A * | 7/1962 | Witbro | | 43/17 |
| 3,074,196 A * | 1/1963 | Bronson, Sr. | | 43/17 |
| 3,078,610 A * | 2/1963 | Howell | | 43/17 |
| 3,134,186 A * | 5/1964 | Krueger | | 43/17 |
| 3,147,563 A * | 9/1964 | Molter | | 43/17 |
| 3,156,997 A * | 11/1964 | Smith | | 43/17 |
| 3,190,026 A * | 6/1965 | Roszak | | 43/17 |
| 3,196,570 A * | 7/1965 | Borisch | | 43/17 |
| 3,213,561 A * | 10/1965 | Roemer | | 43/17 |
| 3,283,437 A * | 11/1966 | Galarnean | | 43/17 |
| 3,285,360 A * | 11/1966 | Wetsch | | 43/17 |
| 3,352,048 A * | 11/1967 | Fleming | | 43/17 |
| 3,359,672 A * | 12/1967 | Schwartz et al. | | 43/17 |
| 3,359,673 A * | 12/1967 | Roemer | | 43/17 |
| 3,371,443 A * | 3/1968 | Dobson | | 43/17 |
| 3,378,945 A * | 4/1968 | Johnson | | 43/17 |
| 3,470,647 A * | 10/1969 | Horner | | 43/17 |
| 3,474,561 A * | 10/1969 | McConkey | | 43/16 |
| 3,545,118 A * | 12/1970 | Stelmach | | 43/17 |
| 3,546,805 A * | 12/1970 | Schaefer | | 43/17 |
| 3,599,369 A * | 8/1971 | Carlson | | 43/17 |
| 3,603,017 A * | 9/1971 | Happe | | 43/17 |
| 3,641,693 A * | 2/1972 | Pinnow | | 43/17 |
| 3,645,028 A * | 2/1972 | Rayburn | | 43/17 |
| 3,645,029 A * | 2/1972 | Roemer | | 43/17 |
| 3,698,116 A * | 10/1972 | Rosier | | 43/17 |
| 3,729,849 A * | 5/1973 | Richard | | 43/17 |
| 3,739,514 A * | 6/1973 | Odney | | 43/17 |
| 3,798,630 A * | 3/1974 | Crosthwait | | 43/17 |
| 3,824,730 A * | 7/1974 | Johnson | | 43/17 |
| 3,835,568 A * | 9/1974 | Whitfield | | 43/17 |
| 3,879,880 A * | 4/1975 | Bailey | | 43/17 |
| 3,903,633 A * | 9/1975 | Hutcherson | | 43/17 |
| 4,016,670 A * | 4/1977 | Pihlaja et al. | | 43/17 |
| 4,021,958 A * | 5/1977 | Snodie | | 43/17 |
| 4,030,223 A * | 6/1977 | Loesch et al. | | 43/17 |
| 4,030,233 A * | 6/1977 | Wunsche | | 43/121 |
| 4,033,062 A * | 7/1977 | Denecky | | 43/15 |
| 4,043,070 A * | 8/1977 | Lamothe | | 43/17 |
| 4,120,111 A * | 10/1978 | Young, Jr. | | 43/17 |
| 4,155,188 A * | 5/1979 | Serrill | | 43/17 |
| 4,202,125 A * | 5/1980 | Kovacs | | 43/17 |
| 4,217,720 A * | 8/1980 | Karr | | 43/17 |
| 4,228,609 A * | 10/1980 | Gonnello | | 43/16 |
| 4,270,297 A * | 6/1981 | Yates | | 43/17 |
| 4,285,154 A * | 8/1981 | Grahl | | 43/17 |
| 4,334,377 A * | 6/1982 | Hartwig | | 43/17 |
| 4,373,287 A * | 2/1983 | Grahl | | 43/17 |
| 4,458,437 A * | 7/1984 | Ou | | 43/17 |
| 4,523,403 A * | 6/1985 | Ivy et al. | | 43/17 |
| 4,566,216 A * | 1/1986 | Randall | | 43/17 |
| 4,567,686 A * | 2/1986 | Akom | | 43/17 |
| 4,616,437 A * | 10/1986 | Harvey | | 43/17 |
| 4,620,387 A * | 11/1986 | Bloom | | 43/17 |
| 4,640,038 A * | 2/1987 | Jershin | | 43/17 |
| 4,642,930 A * | 2/1987 | Graf | | 43/17 |
| 4,662,099 A * | 5/1987 | Stewart | | 43/17 |
| 4,667,432 A * | 5/1987 | Torgrimson | | 43/17 |
| 4,727,673 A * | 3/1988 | Dumar | | 43/17 |
| 4,750,286 A * | 6/1988 | Gray | | 43/15 |
| 4,807,384 A * | 2/1989 | Roberts, Sr. | | 43/17 |
| 4,823,494 A * | 4/1989 | Waterman | | 43/17 |
| 4,829,697 A * | 5/1989 | Nakata | | 43/17 |
| 4,837,965 A * | 6/1989 | True | | 43/17 |
| 4,887,777 A * | 12/1989 | Rasmussen | | 43/17 |
| 4,907,363 A * | 3/1990 | Dury | | 43/17 |
| 4,928,419 A * | 5/1990 | Forrestal | | 43/17 |
| 4,934,090 A * | 6/1990 | Storey et al. | | 43/17 |
| 4,942,687 A * | 7/1990 | Post | | 43/17 |
| 4,980,986 A * | 1/1991 | Harper | | 43/17 |
| 4,996,788 A * | 3/1991 | Wieting et al. | | 43/17 |
| 5,050,332 A * | 9/1991 | Cross | | 43/17 |
| 5,050,333 A * | 9/1991 | Debreczeni | | 43/17 |
| 5,067,269 A * | 11/1991 | Eppley et al. | | 43/17 |
| 5,068,995 A * | 12/1991 | Rinehart | | 43/17 |
| 5,074,072 A * | 12/1991 | Serocki et al. | | 43/17 |
| 5,088,223 A * | 2/1992 | Chu | | 43/17 |
| 5,097,618 A * | 3/1992 | Stoffel | | 43/17 |
| 5,101,591 A * | 4/1992 | Frazier et al. | | 43/17 |
| 5,107,616 A * | 4/1992 | Ryder | | 43/43.12 |
| 5,119,577 A * | 6/1992 | Lilly | | 43/17 |
| 5,133,144 A * | 7/1992 | Formica | | 43/17 |
| 5,152,093 A | 10/1992 | Bartys | | |
| 5,152,095 A * | 10/1992 | Combs, III | | 43/43.12 |
| 5,157,855 A * | 10/1992 | Schmidt et al. | | 43/17 |
| 5,163,243 A * | 11/1992 | Wold et al. | | 43/17 |
| 5,168,651 A * | 12/1992 | Wilson | | 43/17 |
| 5,187,892 A * | 2/1993 | Gutierrez | | 43/17 |
| 5,199,205 A * | 4/1993 | Klammer | | 43/17 |
| 5,224,284 A * | 7/1993 | Kelsey et al. | | 43/17 |
| 5,235,773 A * | 8/1993 | Rinehart | | 43/17 |
| 5,245,778 A * | 9/1993 | Gallegos et al. | | 43/16 |
| 5,269,088 A * | 12/1993 | Slaback et al. | | 43/17 |
| 5,274,944 A * | 1/1994 | Laessig | | 43/17 |
| 5,335,440 A * | 8/1994 | Williams | | 43/21.2 |
| 5,339,558 A * | 8/1994 | Monsen | | 43/17 |
| 5,359,802 A * | 11/1994 | Gutierrez | | 43/16 |
| 5,448,849 A * | 9/1995 | Burgett | | 43/17 |
| 5,491,923 A * | 2/1996 | Zingrone | | 43/17 |
| 5,524,376 A * | 6/1996 | Flisak | | 43/15 |
| 5,551,183 A * | 9/1996 | Solem | | 43/17 |
| 5,564,213 A * | 10/1996 | Rinehart | | 43/17 |
| 5,570,534 A * | 11/1996 | Ford | | 43/16 |
| 5,829,181 A * | 11/1998 | Fielder et al. | | 43/17 |
| 5,832,652 A * | 11/1998 | Bartys | | 43/17 |
| 5,896,694 A * | 4/1999 | Midha | | 43/17 |
| 5,915,940 A * | 6/1999 | Gross et al. | | 43/17 |
| 5,970,645 A * | 10/1999 | Thill | | 43/17 |
| 5,979,104 A * | 11/1999 | Walker | | 43/43.12 |
| 5,987,801 A * | 11/1999 | Anderson | | 43/17 |
| 5,992,080 A * | 11/1999 | Allen | | 43/15 |
| 6,079,142 A * | 6/2000 | Danser et al. | | 43/17 |
| 6,088,945 A * | 7/2000 | Sanderfoot | | 43/17 |
| 6,094,852 A * | 8/2000 | Roach | | 43/17 |
| 6,119,389 A * | 9/2000 | Walker | | 43/17 |
| 6,170,189 B1 * | 1/2001 | Klein | | 43/17 |
| 6,374,532 B1 * | 4/2002 | Klein | | 43/17 |
| 6,446,380 B1 * | 9/2002 | Radosavljevic et al. | | 43/17 |
| 6,463,691 B1 * | 10/2002 | Atkins | | 43/17 |
| 6,622,421 B1 * | 9/2003 | Daniels | | 43/4.5 |
| 6,634,136 B2 * | 10/2003 | Barrett et al. | | 43/43.12 |
| 6,647,658 B1 * | 11/2003 | Park | | 43/16 |
| 6,688,033 B2 * | 2/2004 | Shaff et al. | | 43/17 |
| 6,708,441 B2 * | 3/2004 | Dirito | | 43/17 |
| 6,789,348 B1 * | 9/2004 | Kneller et al. | | 43/17 |
| 6,857,218 B1 * | 2/2005 | Grahl et al. | | 43/17 |
| 6,898,892 B2 * | 5/2005 | Senckowski | | 43/17 |
| 7,003,912 B1 * | 2/2006 | Morgan et al. | | 43/17 |
| 7,008,086 B1 * | 3/2006 | Kell | | 43/17.5 |
| 7,032,343 B1 * | 4/2006 | Foss | | 43/17 |
| 7,207,133 B2 * | 4/2007 | Schiemann et al. | | 43/17 |
| 7,213,361 B1 * | 5/2007 | Perigo, Sr. | | 43/21.2 |
| 7,322,148 B2 * | 1/2008 | Coulman | | 43/17 |
| 7,395,628 B2 * | 7/2008 | Rayfield | | 43/17 |
| 7,454,861 B1 * | 11/2008 | Keibler | | 43/17 |
| 2003/0208947 A1 * | 11/2003 | Cramer | | 43/17 |
| 2006/0130387 A1 * | 6/2006 | Shumansky | | 43/17 |
| 2006/0179706 A1 * | 8/2006 | Weber et al. | | 43/21.2 |
| 2006/0248779 A1 * | 11/2006 | Settele | | 43/43.12 |
| 2007/0169394 A1 * | 7/2007 | Keller | | 43/17 |
| 2007/0227057 A1 * | 10/2007 | Holmberg | | 43/17 |
| 2009/0165354 A1 * | 7/2009 | Rand | | 43/17 |
| 2009/0272022 A1 * | 11/2009 | Grega | | 43/17 |

* cited by examiner

VISUAL MARK HIGH VISIBILITY ICE FISHING TIP-UP

CROSS REFERENCE TO RELATED APPLICATIONS

This application claims priority to U.S. provisional patent application Ser. No. 60/885,891 filed Jan. 20, 2007, entitled "Visual Mark Ice Fishing Tip-Up" and naming the present inventor, the entire contents which are incorporated herein by reference.

BACKGROUND OF THE INVENTION

1. Field of the Invention

This invention pertains generally to the field of fishing, trapping, and vermin destroying, and more particularly to improvements in fishing signal devices.

2. Description of the Related Art

The sport of ice fishing has evolved from what may have been an essential tool for survival in the northern latitudes many years ago. As may be recognized, during the long winter months there is no opportunity to grow or harvest plants or grains of any type. Man traditionally survived these long winter periods by storing root vegetables, fruits with good storage characteristics such as apples, and by smoking, drying, freezing or otherwise treating meats.

These types of food storage techniques could not always be relied upon. Root cellars and other food storage areas were susceptible to infestation by insect and animal pests, and by crop destroying diseases or undesirably accelerated ripening. As the saying goes, "one bad apple spoils the bunch." Freezing, while seemingly reliable in the cold north, does not work during the occasional warm periods without special shelters. There are also many plants that do not freeze well. Finally, it was historically all but impossible to maintain the optimum sub-zero temperatures used with most modern freezers.

In addition to the challenges of storage, crop and animal production were anything but reliable on a local scale. Weather disasters, animal and insect pests, and diseases all could destroy or substantially reduce an expected harvest. Only through modern transportation and agricultural sciences such as crop genetics and plant and animal chemistry have these vagaries of crops and animals been overcome, such that a more even and predictable food supply is available.

Where sufficiently large and deep bodies of water are present to maintain fresh water below ice, fish survive the winter months. The fish have a reduced level of metabolism, meaning they slow down in the colder water, and so do not consume as much food nor travel as quickly about the body of water. These fish, if retrieved, make an excellent source of food and nutrients, and are often both tastier and nutritionally superior to the alternative foods available locally in these winter months. As a result, fish have long been used as a winter food source. The only challenge then is retrieving them in a desirable and appropriate way, especially in the severe conditions of winter. In view of the importance of fish to winter survival, much effort was made over the years to improve upon ice fishing.

One technique for retrieving fish which developed over the years is referred to as spearing, where a hole is cut in the ice, the water is illuminated by natural or artificial means, and a reflective material such as egg shells may be placed on the bottom of the body of water. Bail may be introduced into the water in the hole. A fisher will then hold a spear next to the opening of the ice, and wait for a fish to pass by or seek the bait. When the fish is positioned appropriately below the ice hole and seen by the fisherman, the fisherman will then rapidly drive the spear into the fish and pull the fish from the water. This type of fishing is quite labor intensive, requiring the full time and attention of a person wielding the spear. Consequently, rather than being a relaxing activity that can include social interaction, spearing is much more an individual activity requiring fairly intense concentration for long periods of time. Furthermore, only one hole may be pursued by a single person at a time. If the fish do not come close enough to the spearing hole to pursue the bait or pass under the ice hole, the fisherman will never have an opportunity to spear the fish. As a result, spearing is a relatively unpredictable method of fishing.

The alternative to spearing fish has been to lure the fish to artificial or live bait that conceals a hook. A hole through the ice is still required, and the bait is placed within the hole. When the fish takes the bait and is thereby hooked, the fisherman pulls the line, bait, hook and fish from the ice. In earlier times, the fisherman was limited in this pursuit of fish by the number of poles that could be held and manipulated, and the space between holes that could physically be reached simultaneously. In other words, only a few lines could be placed, essentially through the same hole or by holes within a few feet of each other. Nevertheless, the fisherman's attention could be diverted from the hole, since a strike would be signaled by a pull on the line, so that the fisherman would know to begin removal of the hooked fish. Consequently, ice fishing permits more social interaction than spearing.

In the modern era, various apparatus have been invented that permit a fisherman to place a plurality of hooked baits in different locations about a water body. Exemplary of this is U.S. Pat. No. 2,654,176 by Kachelski et al, entitled "Ice fishing tip-up," the teachings which are incorporated herein by reference. Using apparatus such as illustrated by Kachelski, a fisherman may simultaneously fish in a number of relatively distantly separated locations. Some similar devices support an ice fishing pole, but as Kacehelski shows, the devices may alternatively substitute a spool of fishing line. With a plurality of lines and baits, the fisherman has a greater probability of catching fish than through a single hole. Furthermore, since fish tend to move about the lake in groups or schools, one location or another may yield fish on any given day, while other locations may not. As a result, these apparatus have gained substantial popularity, increasing both the likelihood of catching fish, and the average number of fish caught per day.

Since a fisherman using modern ice fishing apparatus may be fishing in several different locations simultaneously, there has been a necessity to provide some type of signaling, to notify the fisherman when one or more of these devices is triggered by activity on the line. Such devices are commonly known as tip-ups, since many will lay parallel to the ice when set and waiting for a strike, and then will pop up or pivot in response to a strike. Often times brightly colored flags are used as the signal, and the flags may commonly be held parallel to the ice against a spring force such as may be generated by the flag staff.

These ice fishing tip-ups have gained wide-spread acceptance by fishermen, since they substantially increase the productivity of the fishing trip while also often decreasing the time and attention which must be devoted to the ice hole. With good signaling, such as with a visible flag, the fisherman may even stay within a heated temporary or permanent shelter, and simply visually monitor the status of a plurality of tip-ups active outside of the shelter.

In spite of the utility that these devices provide, there are still some limitations that remain. The first of these is a susceptibility to loss and damage. As may be appreciated, the purpose of a tip-up is to signal the fisherman when a fish is on the line. Otherwise, the tip-up will remain very close to and parallel with the ice. Accompanying winter months is a certain amount of snow. On a snowy day, the tip-up will commonly become partially or completely hidden beneath the accumulation of snow. In such cases, the fisherman may lose track of the location of the tip-up, either being forced to abandon the apparatus or spend much time searching through the snow cover.

Not only doe the fisherman have to keep track of the location of each tip-up, but so do other parties who may be out on the ice at the same time. Since the tip-ups may be relatively remote from a fisherman or his shelter, it can be very difficult for someone traveling in a vehicle to know where these tip-ups are located. All too commonly, tip-ups are destroyed unintentionally by people in vehicles. In fact, this is such a common problem that there have been several reported occasions where state DNR (Department of Natural Resources) employees, who are responsible for enforcement of licensing and catch limits, have accidentally driven over and destroyed tip-ups.

Even when a tip-up is not actually driven on, it is desirable for those traveling in vehicles to stay a reasonable distance from the tip-up. This is because fish are known to be surprisingly sensitive to sound and vibration, and vehicular traffic upon the ice adjacent a hole generates both. Consequently, if a driver knows where a tip-up is located well in advance, the driver may choose a route which is farther removed from the tip-up. Otherwise, the driver may unintentionally and undesirably disrupt the fish and reduce the fisherman's catch for the day.

A number of artisans have designed tip-ups that illustrate the broader concept of a vertical projection that may visually identify the existence of or location of an ice fishing tip-up. Exemplary of such devices are U.S. Pat. No. 2,636,303 by Feigley et al, entitled "Tip-up for ice fishing"; U.S. Pat. No. 3,196,570 by Borisch, entitled "Ice fishing tip-up"; U.S. Pat. No. 3,213,561 by Roemer, entitled "Ice fishing tip-up"; U.S. Pat. No. 3,352,048 by Fleming, entitled "Ice fishing tip-ups"; U.S. Pat. No. 4,270,297 by Yates, entitled "Apparatus for ice fishing"; and U.S. Pat. No. 5,448,849 by Burgett, entitled "Ice fishing apparatus," the teachings of each which are incorporated herein by reference. While each of these apparatus may intrinsically facilitate the location of an operating fishing tip-up through a vertically protruding staff, the identification of existence and location of an active tip-up is at the expense of easily and clearly knowing when a strike has occurred. In other words, since the staff is always up, it can be quite difficult at a distance to determine whether the strike indicator flag is extending vertically from the staff or merely supported on the staff in the ready position. In another U.S. Pat. No. 4,662,099 by Stewart entitled "Ice free tip up system," the teachings which are incorporated herein by reference, a wind vane has been added to an ice fishing device. Like the aforementioned patents, the Stewart patent does not provide ready visual distinction between strike and wind vane. This may be best appreciated by recognizing that the wind vane flag will pivot, and so at times will be visible at a distance and at other times will not be visible, when the viewer is looking in the direction of or directly opposite to the wind. In these instances, even if a strike occurs, the fisherman may inadvertently mistake the strike flag for the wind vane and incorrectly assume that there has not yet been a strike. The wind vane also provides an undesirable source of motion and vibration that can interfere with proper luring of fish to bait. In addition, Stewart and many of the other aforementioned patents suffer from poor construction which does not permit easy and compact storage with simple and rapid set-up. What is desired then is an improved apparatus for indicating the existence of a tip-up, which also is readily and compactly stored, and which does not detract from the ready identification of a strike.

In addition to the aforementioned limitations, another limitation exists in the art of fishing tip-ups. A fisherman may one day be fishing for small pan fish such as crappies and bluegill, and may on another day fish for larger game fish such as walleye and northern pike. Unfortunately, when fishing for larger game fish, the bait used by many fishermen is nearly as large as the pan fish. Consequently, if the tip-up flag is sensitive to and triggered by pan fish, the hooked bait used to lure large game fish will undesirably trigger the strike indicator flag. Alternatively, if the strike flag is insensitive to the game fish bait, it will also not reliably trigger upon the occurrence of a strike by pan fish. A similar problem arises with vibrations that may be caused by wind turbulence, nibbles, or other factors. These vibrations may result in the strike flag being triggered prematurely, simply because the vibration causes a gradual, definite movement between the strike flag and trigger. In order to prevent vibrations from prematurely releasing the flag, U.S. Pat. No. 4,727,673 by Dumar, entitled "Indicator light for an ice fishing tip-up," the teachings which are incorporated herein by reference, illustrates a trigger that has grooves in the form of detents, which results in larger shoulders on the trigger. The flag staff rests within those grooves, and so is not affected by vibration. However, this design does not eliminate the need for alternative forces of activation, and instead simply makes the tip-up less able to be used with smaller pan fish.

A few artisans have attempted to address this need by providing a strike indicator flag sensitivity control or adjustment. The patents relevant thereto, and the teachings which are incorporated herein by reference, include U.S. Pat. No. 4,662,099 by Stewart, entitled "Ice free tip up system," which describes wing nut as adjusting line tension required to rotate a trip lever; U.S. Pat. No. 5,152,093 by Bartys, entitled "Fishing tip-up construction"; and U.S. Pat. No. 5,915,940 by Gross et al, entitled "Tip-up device with adjustable sensitivity". These adjustments require special constructions and components that are less desirable, and in several cases not adaptable to fishing tip-ups of the Kachelski et al construction. Consequently, there also exists a need for a simple and reliable way to provide sensitivity adjustment without sacrificing cost, complexity or convenience.

Webster's New Universal Unabridged Dictionary, Second Edition copyright 1983, is additionally incorporated herein by reference in entirety for the definitions of words and terms used herein.

SUMMARY OF THE INVENTION

In a first manifestation, the invention is a fishing tip-up having a base, spool, tip-up indicator and visual marker. The base has a generally planar top surface and a generally planar bottom surface that define a longitudinally expansive body. The body is operative to span an opening in ice formed above a body of water, and defines a first base end and a second base end distal along a longitudinal axis from the first end. A spool is coupled with and supported by the base in a location relatively central between the base first and second ends. A tip-up indicator is coupled with and supported by the base adjacent the base first longitudinal end. The indicator extends normal to the base when indicating a strike, and alternatively extends generally parallel to the base from first longitudinal end towards and adjacent to the second longitudinal end when set to detect a strike. A visual marker is provided adjacent to the base second longitudinal end and is pivotal with respect to the base from a first storage position located entirely between base top surface plane and base bottom surface plane to a second active position perpendicular to the base top surface plane.

In a second manifestation, the invention is an ice fishing tip-up that has a base, a spool, a spool support, a tip-up indicator, a flag stay operative to selectively engage with and retain the tip-up indicator, and a coupling rod which transmits rotary motion from spool to flag stay and which is operative to disengage the tip-up indicator responsive to a strike. The improvement according to the invention comprises bending the flag stay from the coupling rod to form a linear extension oriented at an angle less than ninety degrees relative to the coupling member.

In a third manifestation, the invention is an ice fishing tip-up that has a base, a spool, a spool support, a tip-up indicator, a flag stay operative to selectively engage with and retain the tip-up indicator, and a coupling member which transmits rotary motion from spool to flag stay and which is operative to disengage the tip-up indicator responsive to a strike. The improvement according to the invention comprises a friction member adjacent a termination of the flag stay that extends along the flag stay towards the coupling member. The friction member increases friction between tip-up indicator and flag stay.

OBJECTS OF THE INVENTION

Exemplary embodiments of the present invention solve inadequacies of the prior art by providing a visual marker rod which operates separately from the tip-up indicator. The visual marker rod comprises a slender staff and reflective tape, to visually distinguish the marker rod from strike indicator flag. In addition, a flag stay or trigger is provided which deviates from the longitudinal axis of the pivoting inner rod by more than ninety degrees, such that the inner rod and flag stay may be positioned to capture and hold a tip-up indicator flag in an orientation generally parallel to the tip-up base. The flag stay, in addition to angle, also incorporates an elastomeric apparatus to hold the tip-up indicator flag at more than one position along the flag stay, thereby permitting reliable and repetitive setting of different trigger forces.

A first object of the invention is to an improved apparatus for visually indicating the presence and location of an active tip-up even when covered with moderate amounts of snow, thereby providing sufficient visual distinctness to ensure that both fishermen and drivers will easily recognize the tip-up. A second object of the invention is to provide a tip-up with visual marker which also is readily and compactly stored, and which does not detract from the ready identification of a strike. Another object of the present invention is to provide a tip-up with visual marker which does not alter or interfere with operation of the tip-up in any way. A further object of the invention is to provide a simple and reliable way to adjust tip-up sensitivity, without sacrificing cost, complexity, size or convenience.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
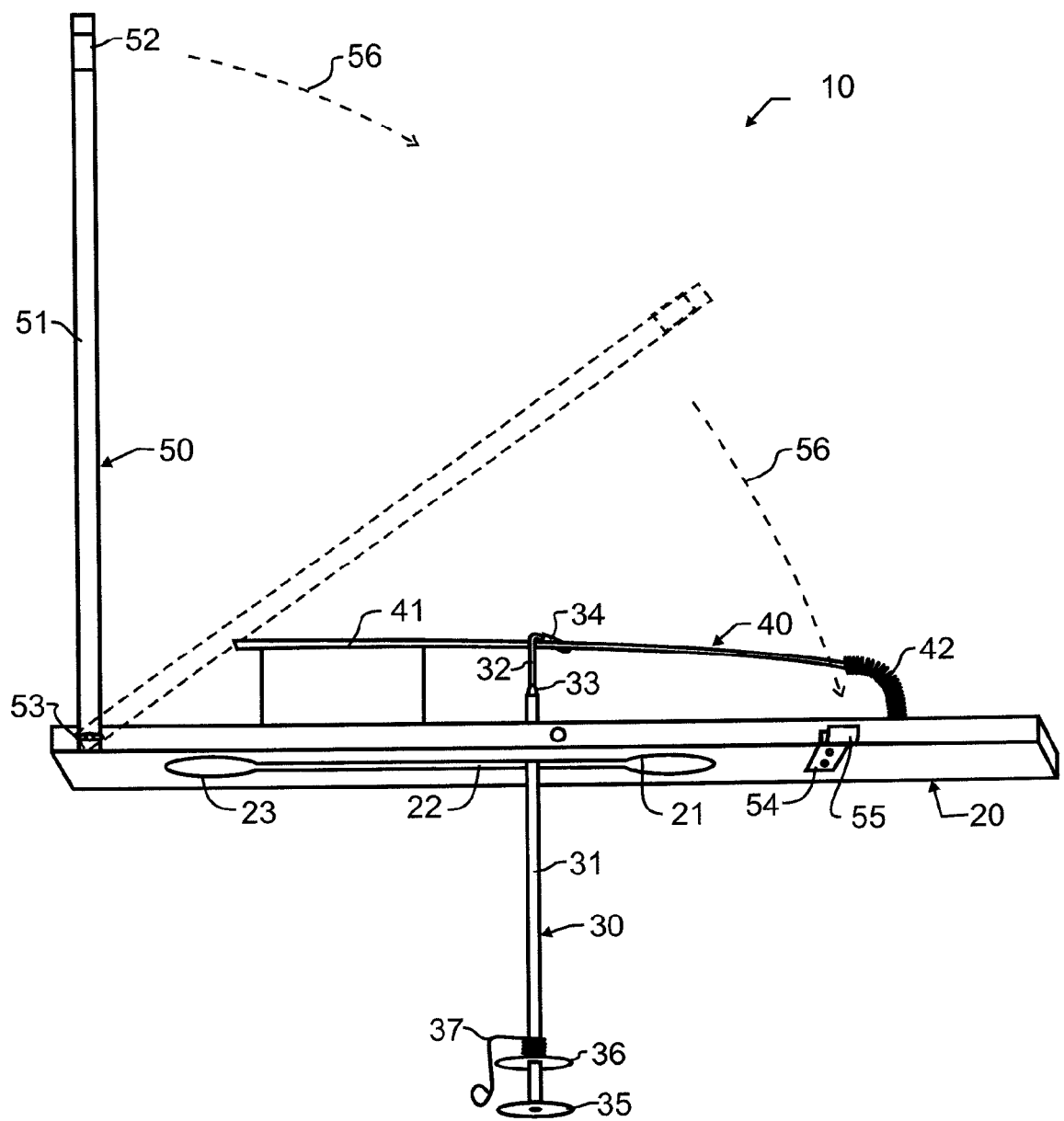
FIG. 1 illustrates a preferred embodiment visual mark high visibility ice fishing tip-up designed in accord with the teachings of the invention from front elevational view at an elevation just below ice level, and in an active and operational position.

In a most preferred embodiment of the invention illustrated in the figures, and with reference to the numerals identified therein, a visual mark high visibility ice fishing tip-up 10 is comprised of four main assemblies. A base 20 is provided which will most preferably span a hole drilled, cut or otherwise created through an ice layer covering a body of water. Suspended from base 20 and extending from above the water through the ice hole into the water is a spool support 30. A tip-up indicator 40 is similarly supported upon base 20, and is operatively coupled to spool support 30, as will be discussed herein below. Finally, a visual marker rod 50 is also supported from base 20.

Base 20 must have sufficient length, as aforementioned, to span a hole within which a fisherman wishes to place a line. In the preferred embodiment, base 20 has several features, including openings 21-23, which are configured to receive and encompass spool support 30 when visual mark tip-up is configured for storage. In the most preferred embodiment, openings 21 and 23 are of equal size, which reduces manufacturing costs when base 20 is produced from wood. However, these openings may be of diverse size or shape, as will be determined at the time of design.

Spool support 30 resembles prior art spool supports such as illustrated by Kachelski et al incorporated by reference herein above, and functions in a similar way. An outer tube 31 encompasses an inner rod 32 therein. Bearing surfaces such as bushing 33 are preferably provided, such that inner rod 32 may spin freely within tube 31. In the preferred embodiment, bushing 33 may preferably be manufactured from a low wear, water and ice resistant polymer material which provides low friction in all conditions of use. One such suitable polymer is sold by DuPont under the trademark Delrin, a polyoxymethylene thermoplastic, though other materials will be apparent to those skilled in the plastics art.

Figure 2:
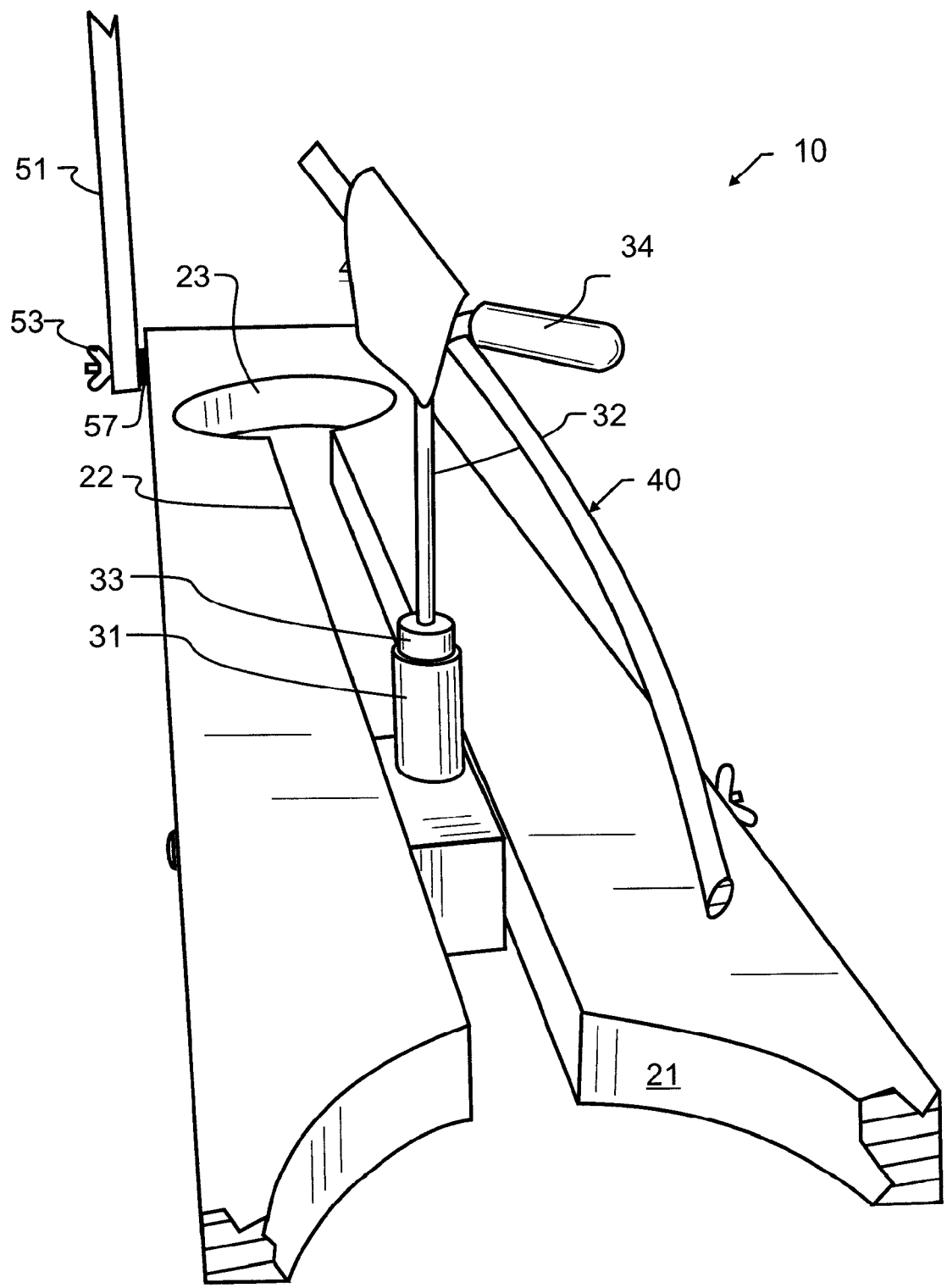
FIG. 2 illustrates the central section of the preferred embodiment from enlarged or close-up and projected view and in an operative position as illustrated in FIG. 1.

Terminating at or adjacent to one end of inner rod 32 is a flag stay 34, which deviates from the longitudinal axis of inner rod 32 by more than ninety degrees, such that inner rod 32 and flag stay 34 may be positioned as shown in FIGS. 1 and 2 to capture and hold tip-up indicator 40 in an orientation generally parallel to base 20. Flag stay 34 is most preferably bent through a ninety-three degree angle, which results in the formation of an angle of eighty-seven degrees between inner rod 32 and flag stay 34. This angle is most preferred for reasons which will be described further herein below.

Distal to flag stay 34, and rigidly coupled to inner rod 32, is spool 35. Spool 35 will in operation carry an indeterminate length of fishing line, and will commonly be terminated with a hook and bait or lure. Firmly coupled to tube 31 is line guide 37, which simply ensures that fishing line being drawn from spool 35 will cause spool 35 to turn, and in turn thereby cause flag stay 34 to rotate. Line guide 37 will, of course, further help to ensure that line wrapped about spool 35 remains neatly thereabout.

Tip-up indicator 40 has an indicator such as flag 40 on one end thereof distal to base 20, and most preferably has a spring 42 or other suitable resilient member or feature adjacent to base 20. This permits tip-up indicator 40 to be held in the position illustrated in FIG. 1 by forces working against those of spring 42. The inclusion of a separate and distinct spring 42 is preferred but not essential, so long as tip-up indicator 40 is intrinsically sufficiently resilient to provide the desired spring force without detrimental fatigue or failure. In the preferred embodiment visual mark tip-up indicator 10, tip-up indicator 40 is flexed down and flag stay 34 rotated to capture tip-up indicator 40 therein. Sufficient rotation of shaft 32 will lead to tip-up indicator 40 being released from flag stay 34, at which time spring 42 will have sufficient force to orient tip-up indicator 40 normal to base 20. Once released from flag stay 34, tip-up indicator 40 will extend vertically above the ice hole, and thereby visually signal that a strike has occurred.

Flag stay 34 is comprised by a combination of center rod and an elastomeric coating. The center rod, extending integrally from inner rod 32, might, for exemplary purposes only and not limited thereto, comprise a metal corrosion-free or corrosion resistant rod. Adjacent to the termination thereof, this center rod is in the most preferred embodiment coated or encompassed by an elastomeric material such as rubber, PVC, vinyl, or other suitable material. The purpose of this elastomeric exterior is two-fold: to provide adequate friction to retain tip-up indicator 40 until explicitly rotated by spool 35 out of position; and to reduce the impact of minor vibrations that might otherwise lead to undesired slippage and ultimate displacement between flag stay 34 and tip-up indicator 40. Other materials or coatings may be used which provide one or both characteristics. Nevertheless, both adequate friction and vibration dampening are beneficial to the performance and reliability of the present preferred embodiment. Consequently, a material or mechanical construction capable of providing both characteristics is most preferred. More specifically, by providing adequate friction, tip-up indicator 40 may engage flag stay 34 at any point from immediately adjacent to inner rod 32 to as distal thereto as possible, which would normally be immediately adjacent to a termination of flag stay 34 distal from rod 32. When tip-up indicator 40 is as distal as possible from rod 32, rotation of spool 35 will immediately release tip-up indicator 40 from flag stay 34. This position is the most sensitive, and would normally be used only for smaller pan fish. The inherent elasticity or resilience of flag stay 34 and tip-up indicator 40, as well as the friction therebetween, tend to dampen out or cancel any minor vibrations or forces that could otherwise cause slippage between flag stay 34 and tip-up indicator 40. In other words, and especially when compared to the prior art, flag stay 34 and tip-up indicator 40 will remain highly stable, even when in this lightest setting and exposed to vibrations that would cause false triggering in the prior art. When tip-up indicator 40 is set immediately adjacent to rod 32, owing to the angle between flag stay 34 and rod 32, rotation of spool 32 will not only require a force to overcome the friction between flag stay 34 and tip-up indicator 40, but tip-up indicator 40 will also have to be pushed down by flag stay 34 more closely to base 20. This is because flag stay 34 is bent to form an 87 degree angle with rod 32. Driving tip-up indicator closer to base 20 increases the amount of force required for activation or triggering. Where desired, and as illustrated in FIG. 2, an even greater force may be required to initiate rotation if the coating on flag stay 34 is relatively thick and extends from distal to rod 32 to not quite adjacent therewith. Then not only does tip-up indicator 40 need to be pushed downward by the few extra degrees of bend, but also by an amount equal to the thickness of the coating. Furthermore, the tip-up indicator 40 must initially rise over the ridge formed by the edge of the coating. Each of these factors tend to increase the force required to release tip-up indicator 40 from flag stay 34, when tip-up indicator 40 is initially placed immediately adjacent to rod 32. As a result, a significantly greater activation force is achieved by the fisherman setting tip-up 40 immediately adjacent to rod 32, to thereby permit baiting with large minnows and fishing for larger game fish. For easier or more sensitive triggering of tip-up 40, tip-up 40 will be placed more distal to rod 32.

Another set of force settings are also achieved by rotation of flag stay 34 to a position 180 degrees displaced from that shown in FIG. 2. In this rotated position, slightly greater spring tensions are generated in tip-up indicator 40 than those found in the position shown in FIG. 2. Consequently, tip-up indicator 40 will be slightly less sensitive.

When a prior art ice fishing tip-up such as illustrated by Kachelski et al is configured in an active position similar to that of the present invention shown in the Figures, which is the position during use and prior to strike for the prior art tip-up devices, tip-up indicator 40 is both parallel to and close to base 20. Unfortunately, in this position it may be observed that neither tip-up indicator 40 nor base 20 will be highly visible. This is the intent of the prior art, such that when a fish strikes and is hooked, then tip-up indicator 40 will be released and will extend normal to base 20, and will then be highly visible. The tip-up indicators of the prior art have generally functioned well over the years, but suffer from several drawbacks. One very consequential drawback is this same lack of visibility. In the dark or after a few inches of snow have fallen, visual mark tip-up 10 as shown in FIG. 1, and the tip-ups of the prior art, will be extremely difficult to locate. This means that the tip-ups of the prior art are in danger of becoming lost, and, perhaps much more commonly, driven over and destroyed by vehicles such as cars and snowmobiles traversing the surface of the ice.

To avoid this waste, destruction, and potential harm to the environment, the present invention also provides a visual marker rod 50 which operates separately from tip-up indicator 40. Visual marker rod 50 has an elongate body 51. Terminating body 51 at one end is a visual indicator such as reflective tape 52. Other visual markers, such as flags, lights, a small LED protruding from the tip, or other devices may be provided instead of or in addition to reflective tape 52, and the amount of body 51 which is covered with or provided with additional visual indicators such as tape 52 will be decided by a designer who may consider such issues as cost, appearance, and performance. Terminating body 51 adjacent to base 20 is a pivot adjacent to wing nut 53. In the preferred embodiment, this pivot is simply a threaded stud. A hole passes through elongate body 51, such that elongate body 51 may be slid onto the stud. Then a wing nut 53 or the like is provided which squeezes elongate body between the wing nut 53 and base 20. A standard washer may optionally be provided between wing nut 53 and elongate body 51. In one most preferred embodiment, one or more rubber washers 57 may be provided about the threaded stud and between elongate body 51 and base 20, such that when wing nut 53 is tightened it will compress rubber washer 57, thereby providing friction which tends to prevent elongate body 51 from rotating relative to the base. The presence of a rubber or elastomeric washer 57 permits wing nut 53 visible in FIG. 2 to be tightened with less force, while permitting elongate body to be manually moved to an angular position where it will stay relative to base 20 without having to readjust the wing nut force.

A clip 55 is preferably provided at some distance from pivot and wing nut 53, and simply provides a positive storage position which will hold visual marker rod 50 in a storage position, which is the result of rotation of visual marker rod through the arc illustrated by line 56. Clip 55 may be coupled to base 20 in a variety of ways, but in the preferred embodiment is attached through a small strap-like extension 54 and suitable fasteners. When in this storage position, visual marker rod 50 will be held within the plane of body 20, and immediately adjacent thereto. Consequently, visual marker rod 50 will be out of the way, except when readied for use by rotation to the position shown by solid line in FIG. 1.

From the figures, several additional features and options become more apparent. First of all, the components which comprise visual mark tip-up 10 may be manufactured from a variety of materials, including metals, resins and plastics, ceramics or cementitious materials, or even combinations or composites of the above. The specific material used may vary, though special benefits are attainable if several important factors are taken into consideration. Firstly, the preferred embodiment should be sufficiently weather resistant and durable to withstand the climate for the intended ice and water application, including any forces that may be applied by a fish or during use. Secondly, an optimum selection of materials are preferred for bushings 33, as has already been discussed herein above. Similarly, the swivel for spool support 30 may be fabricated from aluminum for low cost and weather resistance. Finally, many of the remaining components will be fabricated from durable, weather resistant materials or alloys, such as but not limited to stainless steel. Most preferably, these materials will also be materials which are not harmful to the environment.

A variety of ornamental designs have additionally been contemplated for visual mark tip-up 10. The simple and clean geometric shape illustrated herein is most preferred, but it is further contemplated herein to design any suitable shapes and ornamentations as may be desired. The materials used for a particular design may be chosen not only based upon the aforementioned factors such as weather resistance, but may also factor in the particular design.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. An ice fishing tip-up having a base, a spool, a spool support, a tip-up indicator, a flag stay operative to selectively engage with and retain said tip-up indicator, a coupling rod which transmits rotary motion from said spool to said flag say and operative to disengage said flag stay from said tip-up indicator responsive to a strike, said flag stay bending from said coupling rod to form a linear extension oriented at an angle less than ninety degrees relative to said coupling member, wherein the improvement comprises an elastomeric material comprising a coating formed upon said flag stay operative to provide adequate friction to retain said tip-up indicator until explicitly rotated by said spool out of position and operative to reduce minor vibrations that might otherwise lead to undesired slippage and ultimate displacement between said flag stay and said tip-up indicator.

2. The ice fishing tip-up of claim 1, wherein said elastomeric material further comprises vinyl.

3. A fishing tip-up, comprising:
a base having a generally planar top surface and a generally planar bottom surface spaced from said top surface defining a longitudinally expansive body which is operative to span an opening in ice formed above a body of water, said longitudinally expansive body thereby defining a first base end and a second base end distal along a longitudinal axis from said first end;
a spool coupled with and supported by said base relatively central between said base first and second ends;
a tip-up indicator coupled with, terminating at a first end adjacent to, and supported by said base adjacent said base first longitudinal end, said indicator extending normal to said base when indicating a strike, and alternatively extending generally parallel to said base from said first longitudinal end towards and adjacent to said second longitudinal end when set to detect a strike; and
a visual marker pivotally mounted adjacent to said base second longitudinal end and extending longitudinally substantially from said base second longitudinal end to said first base end when in a first storage position, said visual marker pivotal with respect to said base from said first storage position wherein said visual marker is located entirely between said base planar top surface and said base planar bottom surface to a second active position wherein said visual marker is perpendicular to said base planar top surface and is substantially entirely above said base planar bottom surface.

4. The fishing tip-up of claim 3, wherein said base further comprises an opening for receiving said spool between said generally planar top surface and said generally planar bottom surface, whereby said spool may be pivoted into said base opening for storage and transport.

5. The fishing tip-up of claim 3, wherein said visual marker further comprises an illumination source distal to a first end of said visual marker.

6. The fishing tip-up of claim 3, wherein said illumination source further comprises a light.

7. The fishing tip-up of claim 3, wherein said visual marker is pivotal about a pivot adjacent to a first end of said visual marker, said pivot further comprising an elastomeric member and hand tightener to retain said visual marker in any desired orientation about said pivot.

8. The fishing tip-up of claim 7, wherein said elastomeric member and hand tightener further comprise a rubber washer and wing nut, respectively.

9. The fishing tip of claim 3, further comprising:
a flag stay operative to selectively engage with and retain said tip-up indicator;
a coupling rod which transmits rotary motion from said spool to said flag say and is operative to disengage said flag stay from said tip-up indicator responsive to a strike, said flag stay bending from said coupling rod to form a linear extension oriented at an angle less than ninety degrees relative to said coupling member; and
an elastomeric material operative to provide adequate friction to retain said tip-up indicator with said flag stay until explicitly moved by said spool out of position and operative to reduce minor vibrations that might otherwise lead to undesired slippage and ultimate displacement between said flag stay and said tip-up indicator.

10. An ice fishing tip-up having a base, a spool, a spool support, a tip-up indicator, a flag stay operative to selectively engage with and retain said tip-up indicator, a coupling rod which transmits rotary motion from said spool to said flag stay and operative to disengage said tip-up indicator responsive to a strike, said flag stay bending from said coupling rod to form a linear extension oriented at an angle less than ninety degrees relative to said coupling member, wherein the improvement comprises an elastomeric material defining an exterior of said flag stay adjacent to said tip-up indicator and operative to provide adequate friction to retain said tip-up indicator until explicitly rotated by said spool out of position and operative to reduce minor vibrations that might otherwise lead to undesired slippage and ultimate displacement between said flag stay and said tip-up indicator, further comprising a visual marker pivotally mounted adjacent to a longitudinal end of said base and pivotal with respect to said base from a first storage position wherein said visual marker is located co-planar with said base and to a second active position wherein said visual marker is perpendicular to said base and is substantially entirely above said base.

* * * * *